US012449771B2

(12) United States Patent
Maruyama et al.

(10) Patent No.: US 12,449,771 B2
(45) Date of Patent: Oct. 21, 2025

(54) CONNECTING STRUCTURE AND WEARABLE DEVICE

(71) Applicant: CASIO COMPUTER CO., LTD., Tokyo (JP)

(72) Inventors: Yoshihiro Maruyama, Hamura (JP); Masao Amano, Uenohara (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 398 days.

(21) Appl. No.: 18/075,654

(22) Filed: Dec. 6, 2022

(65) Prior Publication Data

US 2023/0176528 A1 Jun. 8, 2023

(30) Foreign Application Priority Data

Dec. 6, 2021 (JP) ................................ 2021-197436
Dec. 6, 2021 (JP) ................................ 2021-197439

(51) Int. Cl.
*G04B 37/16* (2006.01)
*A44C 5/10* (2006.01)
(Continued)

(52) U.S. Cl.
CPC .............. *G04B 37/16* (2013.01); *A44C 5/107* (2013.01); *A44C 5/14* (2013.01); *G04B 37/1486* (2013.01)

(58) Field of Classification Search
CPC ...... G04B 37/16; G04B 37/1486; A44C 5/14; A44C 5/107
See application file for complete search history.

(56) References Cited

U.S. PATENT DOCUMENTS 9,743,724 B2 * 8/2017 Dornhege .......... G04B 37/1493
2008/0245105 A1 * 10/2008 Elbe ...................... A44C 5/107 63/3
2020/0329833 A1 * 10/2020 Matsunaga .............. A44C 5/14

FOREIGN PATENT DOCUMENTS

CN 110881757 A 3/2020
FR 2766587 A1 1/1999
(Continued)

OTHER PUBLICATIONS

Notice of Reasons for Refusal dated Oct. 3, 2023 received in Japanese Patent Application No. JP 2021-197439.
(Continued)

*Primary Examiner* — Edwin A. Leon
*Assistant Examiner* — Sean R Brannon
(74) *Attorney, Agent, or Firm* — Scully, Scott, Murphy & Presser, P.C.

(57) ABSTRACT

A connecting structure includes a connecting pin, a pin catch, a biasing member, and a holder. The connecting pin has a first portion, a second portion thicker than the first portion, and a step therebetween and connects a connecting object and a connected object (objects) by being inserted into their insertion holes. The pin catch moves in a recess in one of the objects in moving directions that are not an extending direction of the insertion holes and has a pin engagement portion that engages the step. The biasing member biases the pin catch in one of the moving directions. The holder is on the one of the objects and transitions, in response to user operation, to a first state where the holder and the biasing member holds the pin catch or a second state where the pin catch is detachable from the recess.

16 Claims, 11 Drawing Sheets

(51) Int. Cl.
*A44C 5/14* (2006.01)
*G04B 37/14* (2006.01)

(56) References Cited

FOREIGN PATENT DOCUMENTS

| | | | | |
|---|---|---|---|---|
| GB | 2227155 | A * | 7/1990 | ............. A44C 5/107 |
| JP | 2004294284 | A | 10/2004 | |
| JP | 2007082597 | A | 4/2007 | |
| JP | 2008253761 | A | 10/2008 | |
| JP | 3194514 | U | 11/2014 | |
| JP | 2020512891 | A | 4/2020 | |
| WO | 2004095969 | A1 | 11/2004 | |
| WO | 2018189219 | A1 | 10/2018 | |

OTHER PUBLICATIONS

Office Action dated Feb. 15, 2024 received in European Patent Application No. EP 22203243.5.
Extended European Search Report dated Apr. 4, 2023 received in European Patent Application No. EP 22203243.5.
Extended European Search Report dated Jan. 31, 2025 for European Patent Application No. 24214465.7.

* cited by examiner

CONNECTING STRUCTURE AND WEARABLE DEVICE

CROSS-REFERENCE TO RELATED APPLICATIONS

The present application is based upon and claims the benefit of priority from Japanese Patent Application No. 2021-197436 filed on Dec. 6, 2021 and Japanese Patent Application No. 2021-197439 filed on Dec. 6, 2021, whose descriptions, claims, abstracts, and drawings are incorporated herein by reference in its entirety.

BACKGROUND OF THE INVENTION

Field of the Invention

The present disclosure relates to a connecting structure and a wearable device.

Description of the Related Art

Conventionally, there has been known various kinds of connecting structures used for connecting a device body and a band of a wearable device such as a wristwatch to each other, or for connecting a plurality of pieces constituting the band to each other. In a typical connecting structure, two members of a connecting object are connected by a connecting pin inserted into through holes in the respective two members. A connecting structure of this kind disclosed in JP 2007-82597 A includes: an engaging recess that is located in the center of a connecting pin in its longitudinal direction and circles its circumference; and a pin catch that is provided in a storage space of one of the two members and moves in a direction perpendicular to the connecting pin. The engaging recess engages the tip of the pin catch, so that the connecting pin is caught so as not to come off the through holes.

SUMMARY OF THE INVENTION

In order to solve the above problems, according to an example of the present disclosure, there is provided a connecting structure including:

a connecting pin that has a first portion, a second portion thicker than the first portion, and a step between the first portion and the second portion and connects the connecting object and the connected object to each other by being inserted into a first insertion hole of a connecting object and a second insertion hole of a connected object;

a pin catch that moves in a recess in one of the connecting object and the connected object in moving directions that are not parallel to an extending direction of an insertion hole of the one of the connecting object and the connected object and has a pin engagement portion that engages the step of the connecting pin, the insertion hole being one of the first insertion hole and the second insertion hole;

a biasing member that biases the pin catch in a direction among the moving directions; and a holder that is provided on the one of the connecting object and the connected object and transitions, in response to user operation, to one of a first state in which the holder holds the pin catch in cooperation with the biasing member and a second state in which the pin catch is detachable from the recess.

In order to solve the above problems, according to an example related to the present disclosure, there is provided a wearable device including:

a device body as the connecting object;

a band as the connected object that attaches the device body to an object; and the connecting structure according to an example of the present invention.

BRIEF DESCRIPTION OF THE DRAWINGS

FIG. 100 is a diagram showing a configuration of the pin catch.

DETAILED DESCRIPTION OF THE PREFERRED EMBODIMENTS

Hereinafter, embodiments of the present invention will be described with reference to the drawings.

<Configuration of Timepiece>

Figure 1:
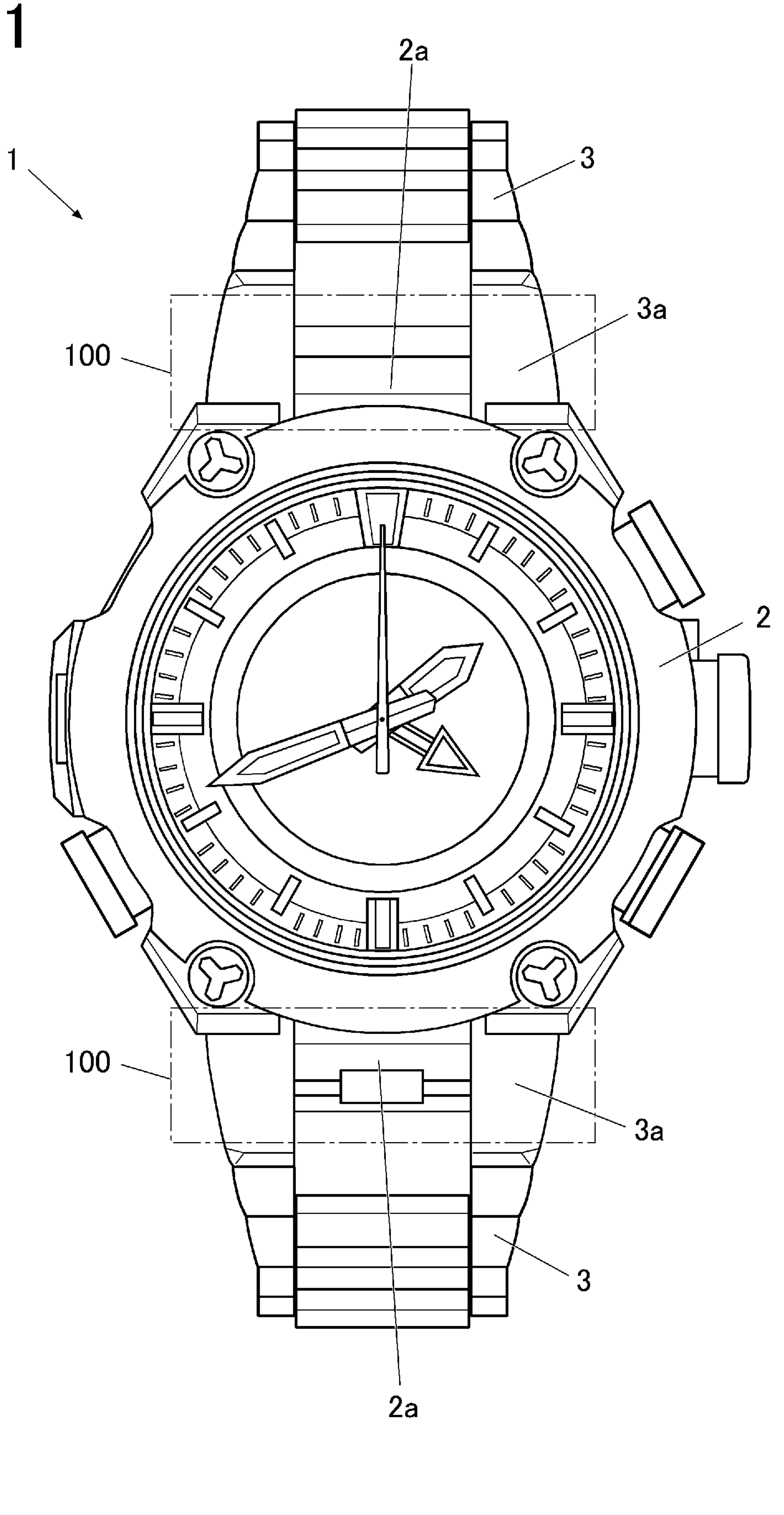
FIG. 1 is a diagram showing a configuration of a timepiece.

FIG. 1 is a diagram showing a configuration of a timepiece 1 of the present embodiment.

The timepiece 1 (wearable device) is a wristwatch having a device body 2 and a band 3 used when worn on a wrist. The device body 2 has an outer member (case) and various components (for example, a dial, hands, mechanisms and circuits for operating the hands, and the like) incorporated in this outer member. In the following, the side of the device body 2 on which the hands are located is referred to as a front surface, and the side opposite to the front surface is referred to as a back surface. The device body 2 has band attachments 2*a* to which the band 3 is attached at respective portions corresponding to the 12 o'clock position and 6 o'clock position of the dial on an outer circumference of the outer member. On the other hand, the band 3 has attachment ends 3*a* that are attached to the respective two band attachments 2*a*. Each of the attachment ends 3*a* may be, for example, one of a plurality of pieces constituting the band 3. The timepiece 1 has band connecting structures 100 (connecting structures) that each connect one of the band attachments 2*a* and one of the attachment ends 3*a* of the band 3 to each other. In other words, the band connecting structure 100 connects the device body 2 and the band 3 to each other. There are two band connecting structures 100 corresponding to the two band attachments 2*a*. Each of the band connecting structures 100 connects the device body 2 (band attachment 2*a*) and the band 3 (attachment end 3*a*) and can be attached and detached in response to user operation. Therefore, the user can replace the band 3 according to his/her preference or situation. In the present embodiment, the device body 2 corresponds to a connecting object by the band connecting structures 100, and the band 3 corresponds to a connected object by the band connecting structure 100.

In the connecting structure disclosed in JP 2007-82597 A, the pin catch is prevented from falling by being stored in the storage space of one of the two members such that it cannot be removed from the storage space. Therefore, once pin catch is stored in the storage space, it is not possible to repair or replace the stored pin catch and other parts. Thus, there are problems related to maintenance, which requires a lot of time and money. The connecting structure of the band for solving this problem is described below.

<Configuration of Band Connecting Structure>

Figure 2:
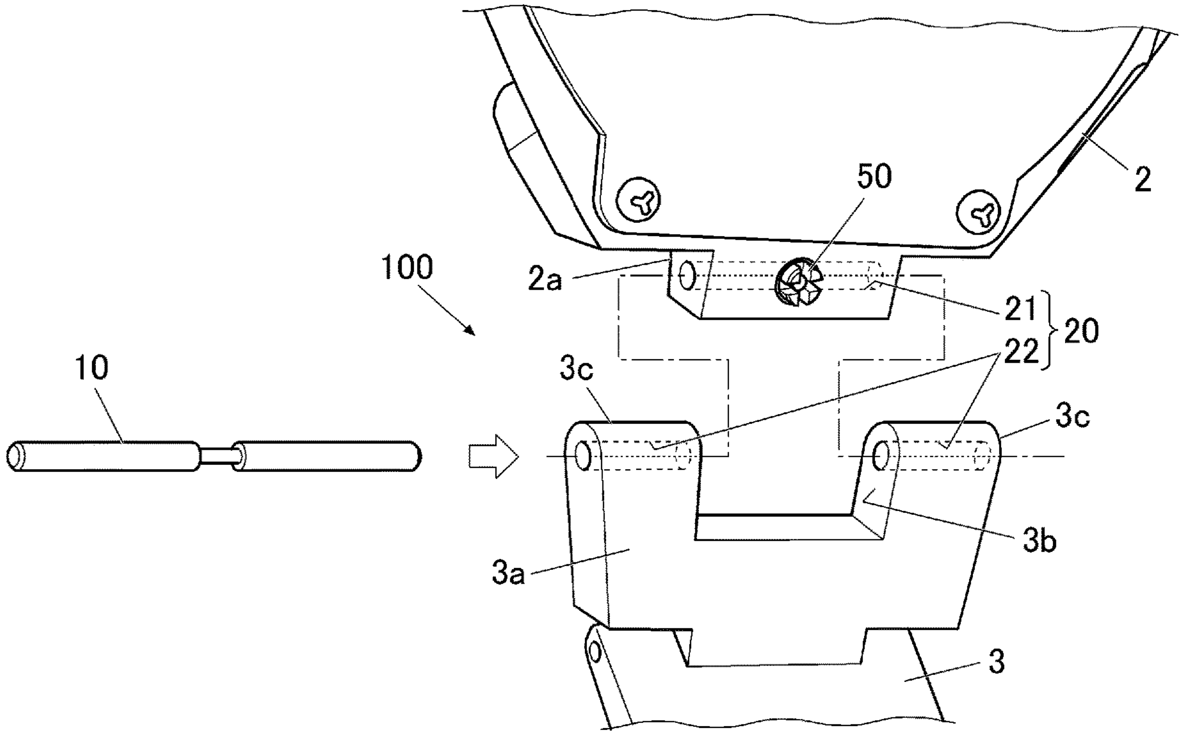
FIG. 2 is a diagram showing a schematic structure of a band connecting structure.

FIG. 2 is a diagram showing the schematic structure of the band connecting structure 100.

The band attachment 2*a* of the device body 2 is on the outer circumference of the device body 2 and protrudes to form a connection protrusion. On the other hand, the attachment end 3*a* of the band 3 has a connection recess 3*b* shaped such that the band attachment 2*a* fits into the connection recess 3*b*. A pair of tips 3*c* of the attachment end 3*a* that are separated because of the connection recess 3*b* have respective band-side insertion holes 22 ((second) insertion hole) extending in the width direction of the band 3. The band attachment 2*a* has a body-side insertion hole 21 ((first) insertion hole) extending in the width direction of the band 3. When the band attachment 2*a* fits into the connection recess 3*b* of the attachment end 3*a*, the body-side insertion hole 21 and the two band-side insertion holes 22 are on a single line and communicate with each other, to form a single communicating insertion hole 20 through the band attachment 2*a* and the attachment end 3*a*. The band connecting structure 100 includes a connecting pin 10 that is inserted into this communicating insertion hole 20 and connect the band attachment 2*a* and the attachment end 3*a*. When the connecting pin 10 is detached from the communicating insertion hole 20, the connection between the band attachment 2*a* and the attachment end 3*a* can be released.

With reference to FIG. 3 to FIG. 7, an overall configuration of the band connecting structure 100 is explained.

Figure 3:
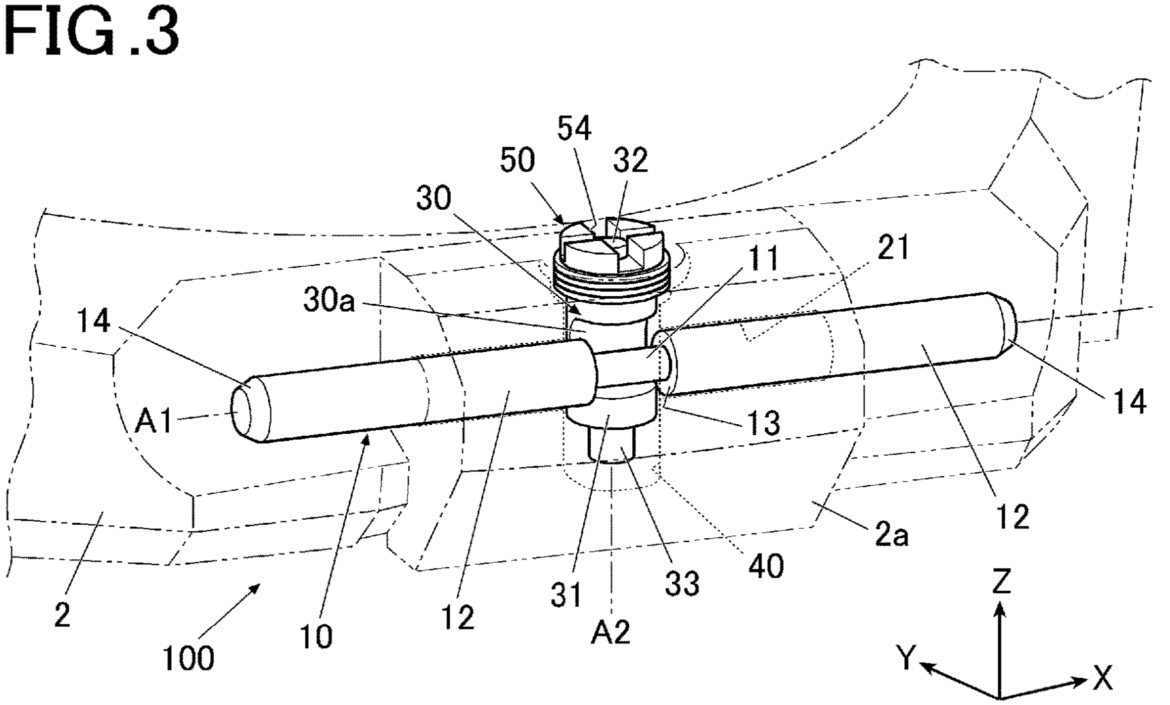
FIG. 3 is a diagonal view showing a configuration of the band connecting structure.
Figure 4:
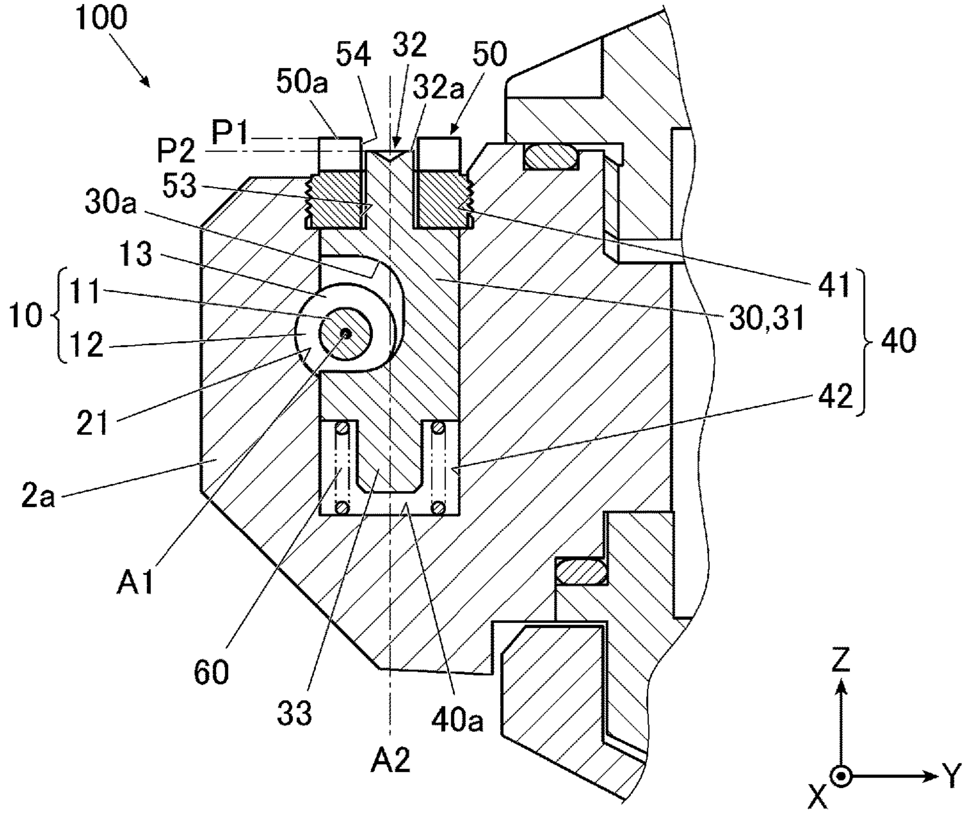
FIG. 4 is a diagram showing a cross section of the band connecting structure perpendicular to an X direction in a connecting pin catching state.
Figure 5:
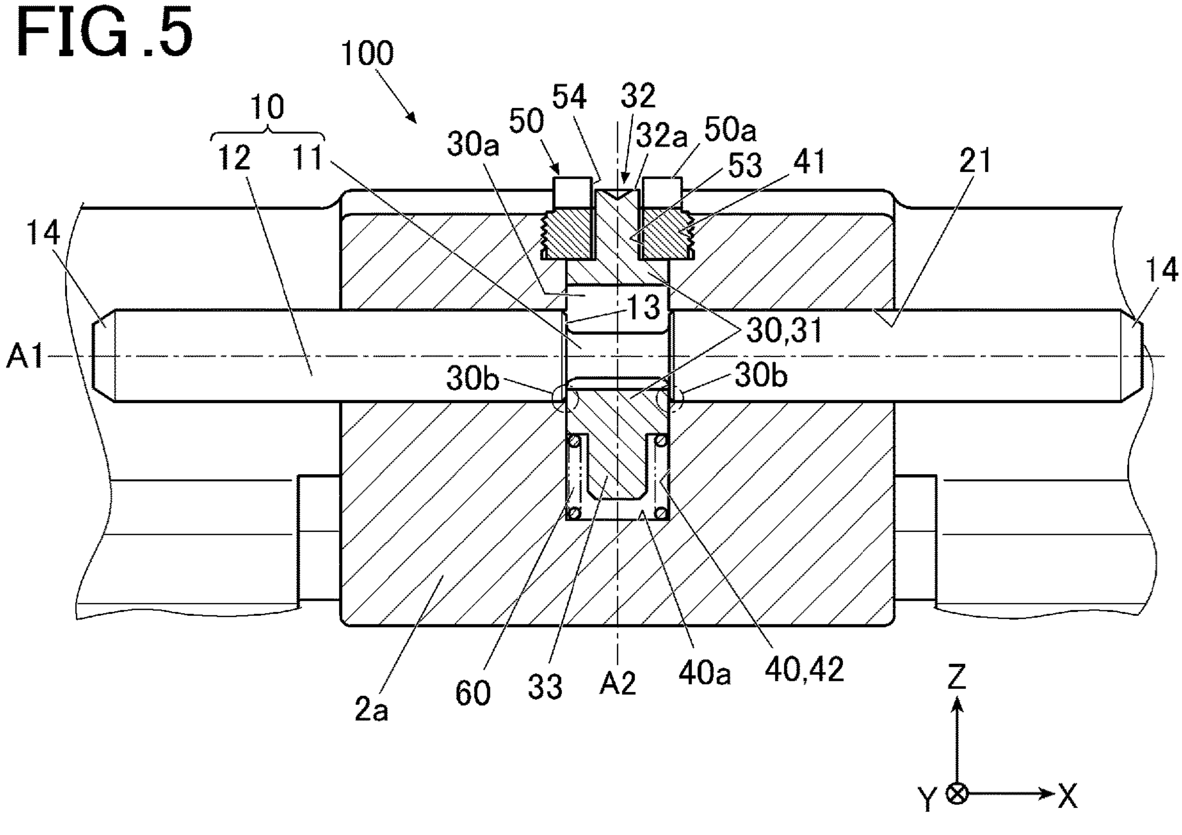
FIG. 5 is a diagram showing a cross section of the band connecting structure perpendicular to a Y direction in the connecting pin catching state.
Figure 6:
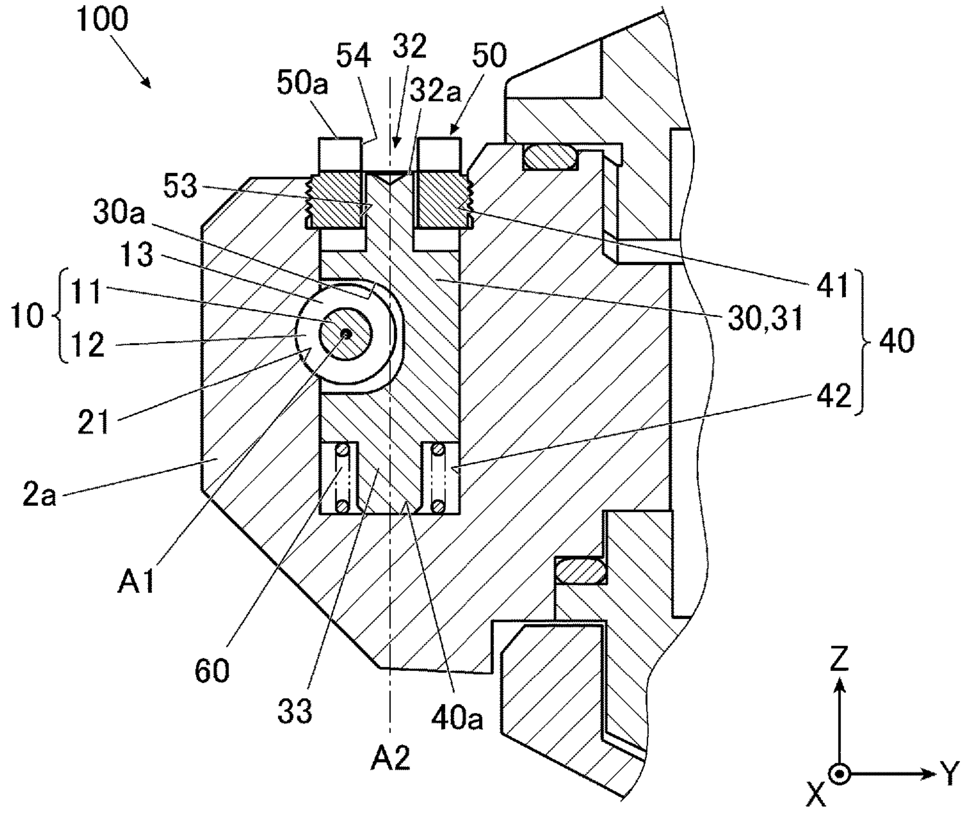
FIG. 6 is a diagram showing a cross section of the band connecting structure perpendicular to the X direction in a connecting pin releasing state.
Figure 7:
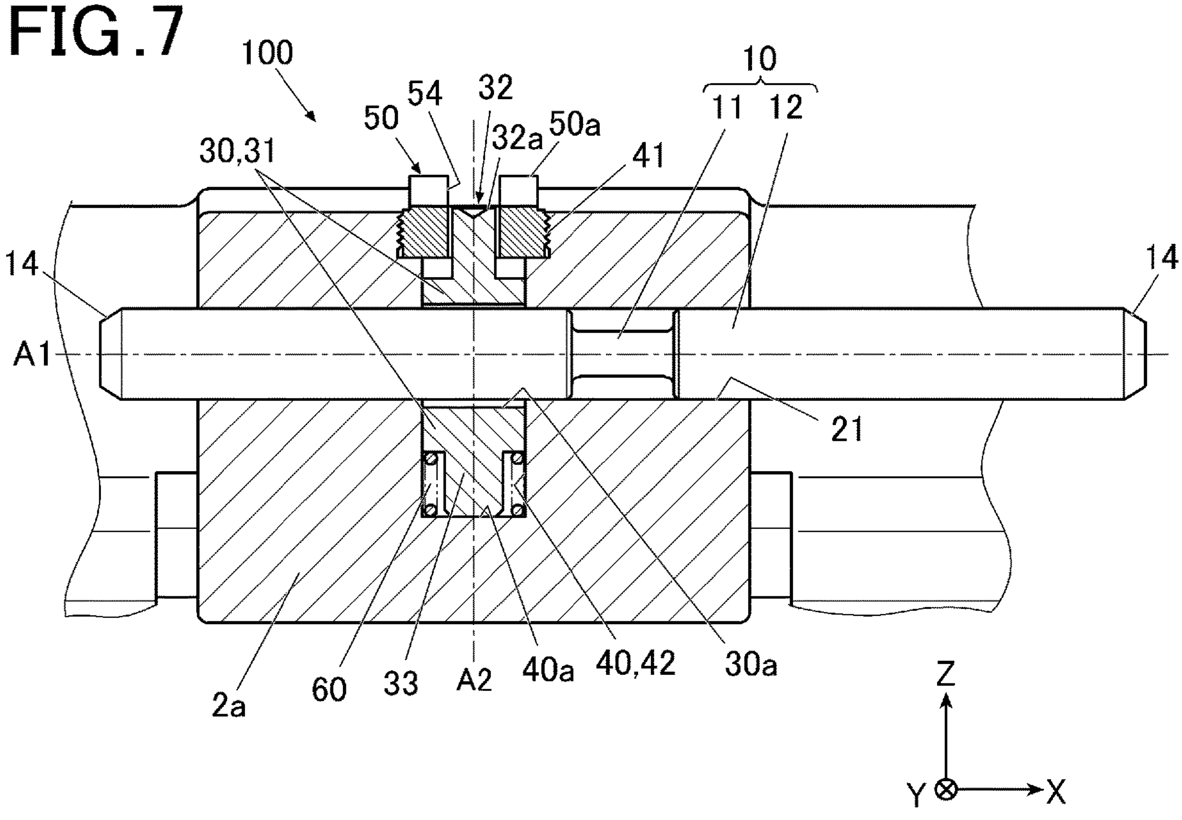
FIG. 7 is a diagram showing a cross section of the band connecting structure perpendicular to the Y direction in the connecting pin releasing state.

FIG. 3 is a diagonal view showing a configuration of the band connecting structure 100. The band 3 is omitted, and the device body 2 is illustrated transparently in FIG. 3, in order that the configuration of the band connecting structure 100 can be easily seen. In FIG. 3, the back surface of the device body 2 is oriented upward. In the following, an XYZ coordinate system is used to explain the orientation of each member of the band connecting structure 100. The X direction is parallel to an insertion axis A1 passing through the center of the insertion hole 20. (In a view from the longitudinal direction of the body-side insertion hole 21 and the band-side insertion holes 22, the insertion axis A1 passes through the center of their cross section perpendicular to the longitudinal direction of the body-side insertion hole 21 and the band-side insertion holes 22.) The (+)Z direction is parallel to the thickness direction of the device body 2 and directed from the front surface to the back surface. The (+)Y direction is perpendicular to the X and Z directions and directed from the band 3 to the device body 2. FIG. 4 and FIG. 6 are diagrams each showing a cross section of the band connecting structure 100 perpendicular to the X direction. FIG. 5 and FIG. 7 are diagrams each showing a cross section perpendicular to the Y direction of the band connecting structure 100. In FIG. 5 and FIG. 7, the band 3 is omitted.

The band connecting structure 100 includes the connecting pin 10, a pin catch 30, a lid 50 (holder), and a spring 60 (biasing member). Among these, the spring 60 is omitted in FIG. 3. The materials of the band attachment 2*a*, the attachment end 3*a*, the connecting pin 10, the pin catch 30, the lid 50, and the spring 60 may be a metal such as a titanium alloy or stainless steel. However, the materials are not limited to a metal, but may be any materials of a certain level of strength such as a resin. The band attachment 2*a* has a recess 40 that communicates with the body-side insertion hole 21 from the back surface side in the −Z direction. The recess 40 extends in a direction parallel to the Z direction and perpendicular to the insertion axis A1. The pin catch 30 and the spring 60 are located in the recess 40 (stored in the recess 40). The lid 50 is detachably attached to an opening edge 41 of the recess 40. When the lid 50 is attached to the opening edge 41, the pin catch 30 and the spring 60 are stored in the recess 40 so as not to come off the recess 40. The pin catch 30 can move in the Z direction in the recess 40. FIG. 4 to FIG. 7 each show a cross section through the central axis A2 of the pin catch 30 (an axis passing the center of the cross section that is perpendicular to the moving directions of the pin catch 30) located in the recess 40.

The spring 60 is, for example, a compression coil spring, located between the bottom of the recess 40 and the pin catch 30, and biases the pin catch 30 toward the lid 50 (toward the opening of the recess 40). When no force is externally applied to the pin catch 30, the pin catch 30 biased by the spring 60 keeps abutting on the lid 50. Thus, the lid 50 holds the pin catch 30 in cooperation with the spring 60. The lid 50 has an opening 53 through which the inside and the outside of the recess 40 are communicated (that is, the opening 53 penetrates the lid 50). Through the opening 53, the pin catch 30 can be pushed (moved) in the −Z direction against the elastic force of the spring 60. That is, the pin catch 30 can move in moving directions (Z direction, −Z direction) that are not parallel to the extending direction in which the insertion hole 20 extends (the direction of the insertion axis A1; X direction). The pin catch 30 has a pin insertion path 30*a* (cutout) at a portion where the insertion axis A1 passes having a size that allows the connecting pin 10 inserted into the body-side insertion hole 21 (communicating insertion hole 20) to pass through. The connecting pin 10 has an almost round bar shape and has a first portion 11 and second portions 12 that are located on both sides of the first portion 11 and have a larger diameter than the first portion 11 (thicker than the first portion).

Figure 10A:
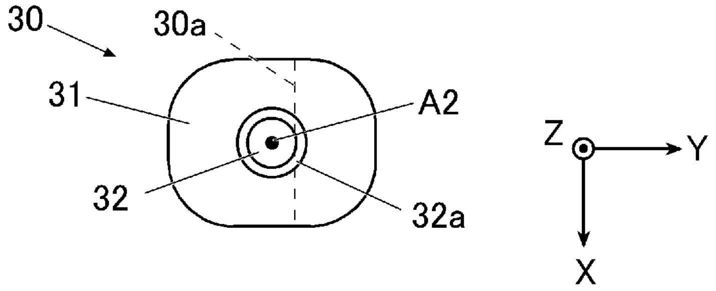
FIG. 10A is a diagram showing a configuration of a pin catch.

As shown in FIG. 3 to FIG. 5, when the pin catch 30 is biased by the spring 60 to abut on the lid 50, the step 13 between the first portion 11 and the second portion 12 of the connecting pin 10 is caught by the edge 30*b* of the pin insertion path 30*a* of the pin catch 30 (see FIG. 5 and FIG. 10A to FIG. 100). As a result, the pin catch 30 catches the connecting pin 10. In the following, the position of the pin catch 30 in abutting on the lid 50 (when the pin catch 30 is held in response to cooperation of the spring 60 and the lid 50) is referred to as a "first position". In the present embodiment, the edge 30*b* of the pin insertion path 30*a* in the pin catch 30 corresponds to a "pin engagement portion" that engages the step 13 of the connecting pin 10.

On the other hand, as shown in FIG. 6 and FIG. 7, when the pin catch 30 is pushed through the opening 53 in response to user operation, for example, against the elastic force (biasing force) of the spring 60 and moves to a "second position (the position of the pin catch 30 shown in FIG. 6 and FIG. 7)" which is on the −Z direction of the first position, the edge 30*b* of the pin insertion path 30*a* no longer catches the step 13, and the entire connecting pin 10 can pass through the pin insertion path 30*a*. Therefore, the connecting pin 10 can be taken out of the body-side insertion hole 21 (communicating insertion hole 20) to release the connection between the device body 2 and the band 3.

Hereinafter, detailed configurations of the recess of the band attachment 2*a* and each part of the band connecting structure 100 are described.

<Recess>

As shown in FIG. 4 to FIG. 7, the recess 40 has an opening edge 41 located at an end in the +Z direction and a major portion 42 located on the −Z direction of the opening edge 41. The major portion 42 extends in the −Z direction beyond the body-side insertion hole 21. The recess 40 (major portion 42) has a bottom 40*a* (wall) parallel to the X-Y plane. A part of the major portion 42 intersects the body-side insertion hole 21. The sidewall surface of the major portion 42 corresponds to the sidewall surface among the walls of the recess 40 extending in the moving directions of the pin catch 30. The sidewall surface of the major portion 42 abuts on the side surface of the pin catch 30 (the side surface of the pin catch 30 extending in the moving directions of the pin catch 30).

Figure 8:
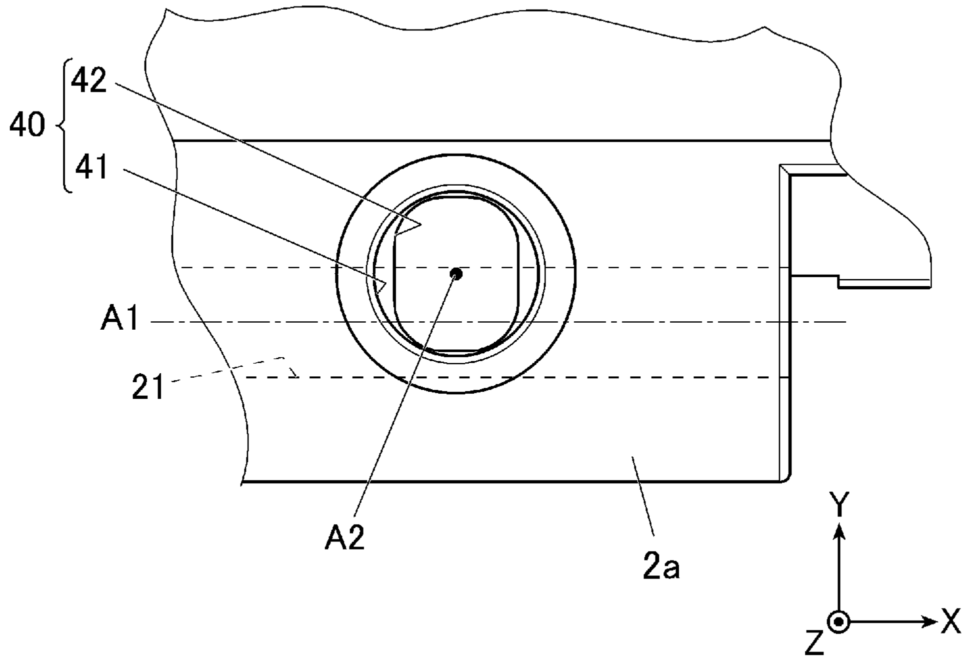
FIG. 8 is a diagram showing a recess from the +Z direction.

FIG. 8 is a diagram showing the recess 40 in a view from the +Z direction.

In FIG. 8, the recess 40 is illustrated with the connecting pin 10, the pin catch 30, the lid 50, and the spring 60 are removed. The shape of the major portion 42, in a view from the direction in which the central axis A2 extends (hereinafter referred to as a "central axis A2 direction"), has a smaller size in the X direction (the first direction) than in the Y direction (second direction). The major portion 42 of the present embodiment has a shape of an oval (rounded rectangle) that is long in the Y direction in a view from the central axis A2 direction. In other words, the major portion 42 has a shape formed by hollowing out the band attachment 2*a* such that an oval cylinder, whose cross section perpendicular to the central axis A2 is an oval, is cut out from the band attachment 2*a*. The sidewall surface of the main part 42 has the shape of the side surface of the oval cylinder. The major portion 42 may have a shape formed by cutting out an elliptical cylinder from the band attachment 2*a*. In this case, the shape of the major portion 42 in a view from the central axis A2 direction is an ellipse.

The opening edge 41 of the recess 40 has a circular shape in a view from the central axis A2 direction, which fits into the outer circumference of the lid 50. As shown in FIG. 4 to FIG. 7, the opening edge 41 has a thread groove on its cylindrical sidewall surface for screwing the lid 50.

As shown in FIG. 4, FIG. 6, and FIG. 8, the central axis A2 of the pin catch 30 in the recess 40 does not intersect the insertion axis A1 of the body-side insertion hole 21, but is shifted in the +Y direction relative to the insertion axis A1.

<Lid>

Figure 9A:
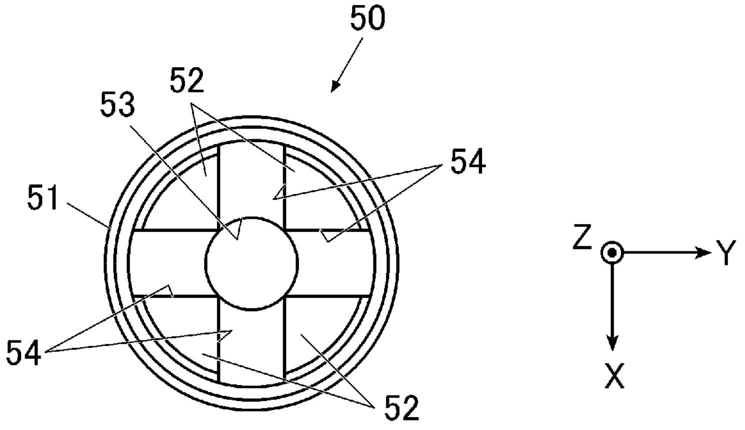
FIG. 9A is a diagram showing a configuration of a lid.
Figure 9B:
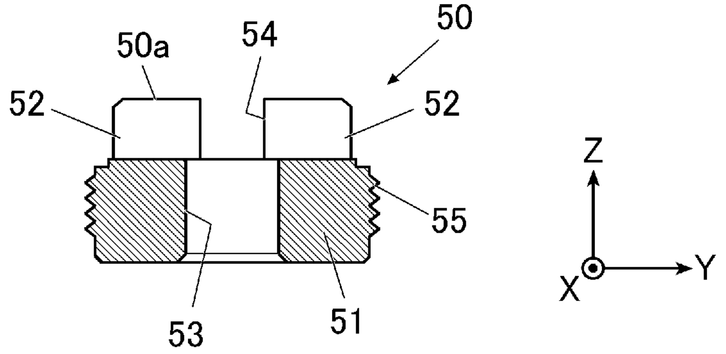
FIG. 9B is a diagram showing a configuration of the lid.

FIG. 9A and FIG. 9B are diagrams each showing the configuration of the lid 50.

FIG. 9A is a diagram showing the lid 50 in a view from the +Z direction, and FIG. 9B is a diagram showing a cross section of the lid 50 perpendicular to the X direction, passing through the center of the opening 53.

The lid 50 is an approximately cylindrical member having a base 51 and a protrusion 52. The base 51 has the opening 53. The protrusion 52 protrude from the base 51 outwardly in the moving direction (+Z direction) of the pin catch 30. The opening 53 penetrates the base 51 in the Z direction so that the inside and outside of the recess 40 are communicated. The opening 53 is at the center of the lid 50 in a view from the Z direction. The sidewall surface of the opening 53 shown in FIG. 9A and FIG. 9B is a cylindrical surface, but is not limited to this.

The side surface of the base 51 has a thread ridge 55 that fits into the thread groove on the sidewall of the opening edge 41 of the recess 40. This thread ridge 55 allows the base 51 of the lid 50 to be screwed into the opening edge 41 of the recess 40. The lid 50 is thus detachably attached to the opening edge 41 of the recess 40. The state in which the lid 50 is attached to the opening edge 41 is a "first state" in which the lid 50 holds the pin catch 30 in cooperation with the spring 60.

On a top surface 50*a* (end surface in the +Z direction) that is opposite to a surface facing the spring 60 (on the side of the recess 40), the protrusion 52 has a groove 54 that fits a tool (such as a screwdriver) used to rotate the lid 50 when attaching the lid 50 to the opening edge 41 of the recess 40 and when detaching the lid 50 from the opening edge 41. In the present embodiment, the groove 54 is formed in the X and Y directions to be a cross-shaped groove 54 that fits a Phillips screwdriver or the like, but is not limited to this. The groove 54 may have a straight line shape that fits a flat-blade screwdriver or the like, or may be a groove shaped to fit any other suitable tool (for example, a hexagonal wrench). Upon manufacture of the timepiece 1, the lid 50 is attached to the opening edge 41 while the pin catch 30 and the spring 60 are stored in the recess 40. When there is a problem (failure, deterioration, and the like) with the pin catch 30 and/or the spring 60, the pin catch 30 and/or the spring 60 can be taken out with the lid 50 removed, which allows for easy maintenance such as repair or replacement. The state in which the lid 50 is detached from the opening edge 41 is a "second state" in which the pin catch 30 can be detached from the recess 40. The lid 50 is in the first state when attached to the device body 2 and is in the second state when detached from the device body 2. That is, the lid 50 can be selectively operated to be in the first state and in the second state.

<Connecting Pin>

As shown in FIG. 3, FIG. 5, and FIG. 7, the connecting pin 10 inserted into the body-side insertion hole 21 (communicating insertion hole 20) has the first portion 11 and the second portions 12. The first portion 11 is located in the center of the connecting pin 10 in the X direction and has a cylindrical shape. The second portions 12 are located on both sides of the first portion 11 and have a larger diameter than the first portion 11. The cylindrical shape may have a tapered end(s) in the embodiment. The shape of the connecting pin 10 can be also described as a shape having a groove around the outer circumference at the first portion 11 so that the diameter of the first portion 11 is smaller than those of the adjacent second portions 12. The connecting pin 10 of such a configuration has a step(s) 13 at a border between the first portion 11 and the second portion(s) 12. The step 13 has a shelf-like stepping surface perpendicular to the X direction. The length of the first portion 11 in the X direction is slightly longer than the width of the pin catch 30 in the X direction. The end of the connecting pin 10 (the end of the second portion 12 opposite to the side of the first portion 11) has a taper 14 with a chamfered corner on the end surface.

<Pin Catch>

Figure 10B:
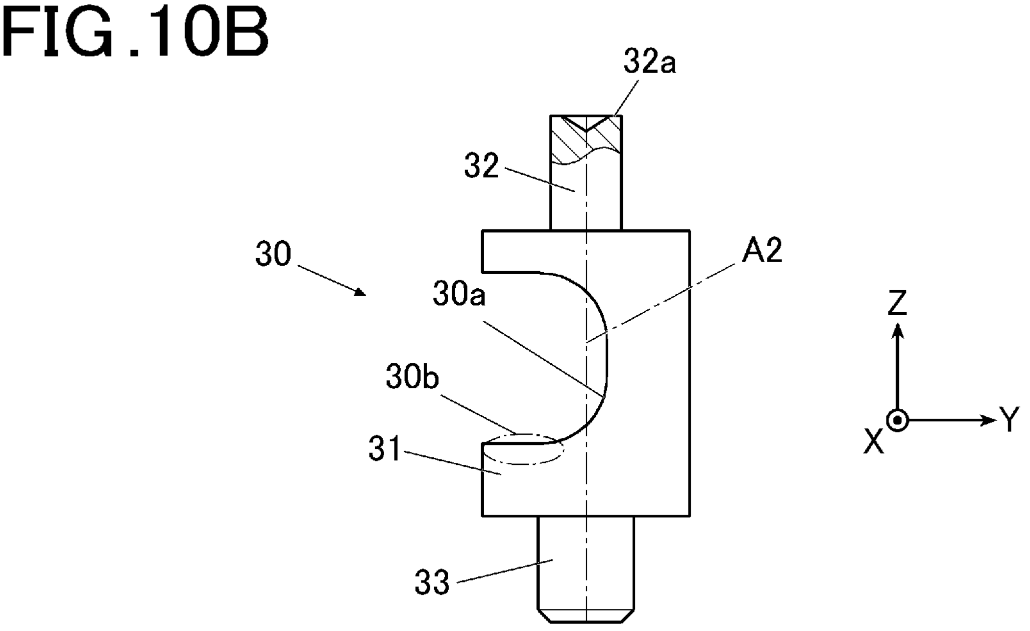
FIG. 10B is a diagram showing a configuration of the pin catch.
Figure 10C:
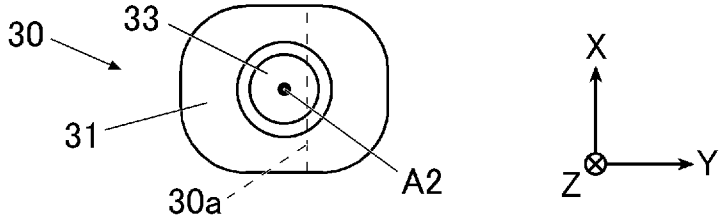

FIG. 10A to FIG. 10C are diagrams each showing a configuration of the pin catch 30.

The pin catch 30 includes a main body 31, a pusher 32 located on the +Z direction of the main body 31, and an abutment 33 located on the −Z direction of the main body 31. The central axis A2 of the pin catch 30 is illustrated in FIG. 10A to FIG. 10C.

The main body 31 has a shape of an oval pillar which is oval in a view from the central axis A2 direction, having the pin insertion path 30*a* (cutout). As shown in FIG. 3 to FIG. 7, the side surface of the main body 31 abuts on the sidewall surface of the major portion 42 of the recess 40. In other words, the main body 31 corresponds to a portion of the pin catch 30 that abuts on the recess 40. The side surface of the main body 31 corresponds to the side surface of the pin catch 30 that extends in the moving directions of the pin catch 30. When the pin catch 30 is in the first position, a surface (upper surface) on the +Z direction side of the main body 31 abuts on a surface (lower surface) on the −Z direction side of the lid 50. The shape of the main body 31 in a view from the central axis A2 direction has a smaller size in the X direction (the first direction) than in the Y direction (the second direction). In order to allow the pin catch 30 to move smoothly in the moving directions in the recess 40, the main body 31 has a shape in a view from the central axis A2 direction that ensures a certain gap between the sidewall surface of the major portion 42 of the recess 40 (a shape such as a similar shape that is one size smaller than the sidewall surface of the major portion 42). Thus, for example, when the shape of the major portion 42 is ellipse in a view from the central axis A2 direction, the shape of the main body 31 is also ellipse. Since the gap is very narrow, the gap is not illustrated in FIG. 3 to FIG. 7.

As shown in FIG. 6 and FIG. 7, the pin insertion path 30*a* is sized and located such that all of the first portion 11 and the second portions 12 of the connecting pin 10 can pass through the pin insertion path 30*a* when the pin catch 30 is in the second position. The pin insertion path 30*a* has a shape formed by hollowing out the main body 31 such that a portion corresponding to an oval column whose axis is perpendicular to the central axis A2, does not intersect the central axis A2, and is parallel to the insertion axis A1 is cut out from the main body 31.

The pusher 32 has a cylindrical shape and has a diameter smaller than the minor axis of the oval of the main body 31. The diameter of the pusher 32 is sized so as to pass through the opening 53 of the lid 50. When the pin catch 30 moves in the recess 40 in the Z direction, the pusher 32 moves in the opening 53 of the lid 50 in the Z direction.

As shown in FIG. 4, the end surface 32*a* on the +Z direction side of the pusher 32 is an exposed surface that is exposed through the opening 53 of the lid 50 when the pin catch 30 is in the first position. When the pin catch 30 is in the first position, the end surface 32*a* of the pusher 32 is closer to the spring 40 (bottom 40*a* of the recess 40) than the top surface 50*a* (protrusion top surface) of the protrusion 52 of the lid 50 is. In other words, as shown in FIG. 4, when the pin catch 30 is in the first position, the position P2 in the Z direction of the end surface 32*a* of the pusher 32 is closer to the recess 40 than the position P1 of the top surface 50*a* (holder top surface) of the lid 50 is. The protrusion 52 of the lid 50 is around the end surface 32*a* exposed through the opening 53 in a view from the moving direction (the Z direction) of the pin catch 30.

As shown in FIG. 6 and FIG. 7, even when the pin catch 30 moves in the −Z direction to the second position, a part of the pusher 32 is located in the opening 53 of the lid 50. In other words, even when the pin catch 30 moves between the first position and the second position in the recess 40, the pusher 32 does not come out of the opening 53 of the lid 50. That is, the end surface 32*a* of the pusher 32 moves in the opening 53 of the lid 50 in the central axis A2 direction when the pin catch 30 moves between the first position and the second position in the central axis A2 direction.

The end surface 32*a* of the pusher 32 has a hole that is deeper toward the center. This hole makes it easier to push the center of the end surface 32*a* of the pusher 32 through the opening 53 with a thin rod member or the like.

The abutment 33 has a cylindrical shape, and the diameter of the abutment 33 is smaller than the short axis of the oval of the main body 31. The diameter of the abutment 33 is smaller than the inner diameter of the spring 60, which is a compression coil spring, and the abutment 33 is located inside the spring 60. When the pin catch 30 is in the second position, the abutment 33 abuts on the bottom 40*a* of the recess 40. In other words, in response to user operation of pushing and moving the pin catch 30 (pusher 32) in the −Z direction until the abutment 33 abuts on the bottom 40*a* of the recess 40, the pin catch 30 can be in the second position and in a connection pin releasing state.

The pin catch 30 in such a shape limits the rotation of the main body 31 around the central axis A2, because the shape of the main body 31 in a view from the central axis A2 direction is only slightly smaller than the sidewall surface of the major portion 42 of the recess 40, and is not a perfect circle but an oval. That is, the recess 40 and the pin catch 30 have a shape that limits the rotation of the pin catch 30 around the central axis A2 in the recess 40. In detail, the recess 40 and the pin catch 30 are shaped so as to limit the rotation of the pin catch 30 in the recess 40 around a virtual axis extending in the moving directions of the pin catch 30 (Z direction) and passing through the pin catch 30 to a range that allows the edge(s) 30*b* (pin engagement portion) of the pin insertion path 30*a* to engage the step(s) 13 of the connecting pin 10. The virtual axis corresponds to the central axis A2 of the pin catch 30 in the following example, but may not correspond to the central axis A2.

Figure 11A:
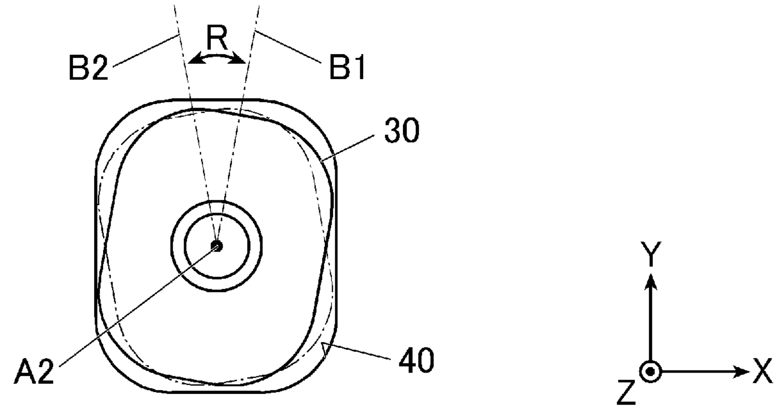
FIG. 11A is a diagram illustrating a limitation of rotation of the pin catch in the recess.
Figure 11B:
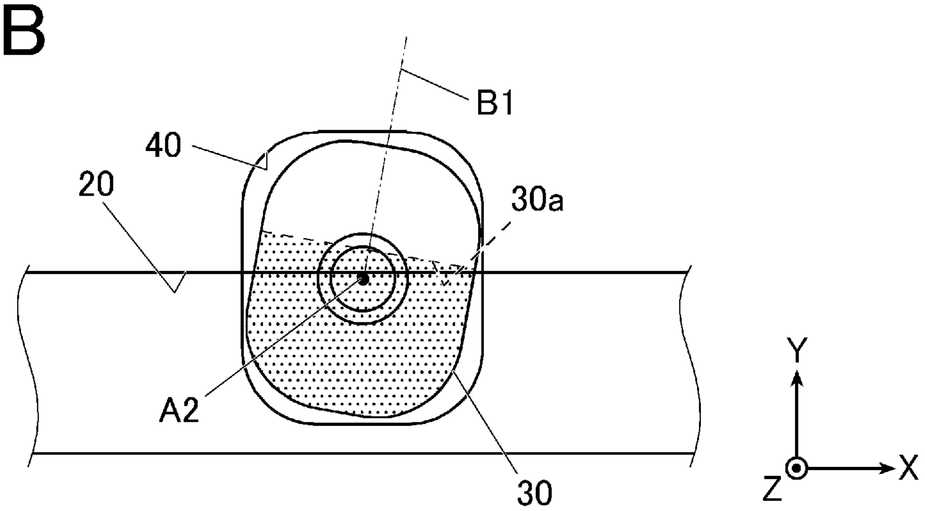
FIG. 11B is a diagram illustrating a limitation of rotation of the pin catch in the recess.
Figure 11C:
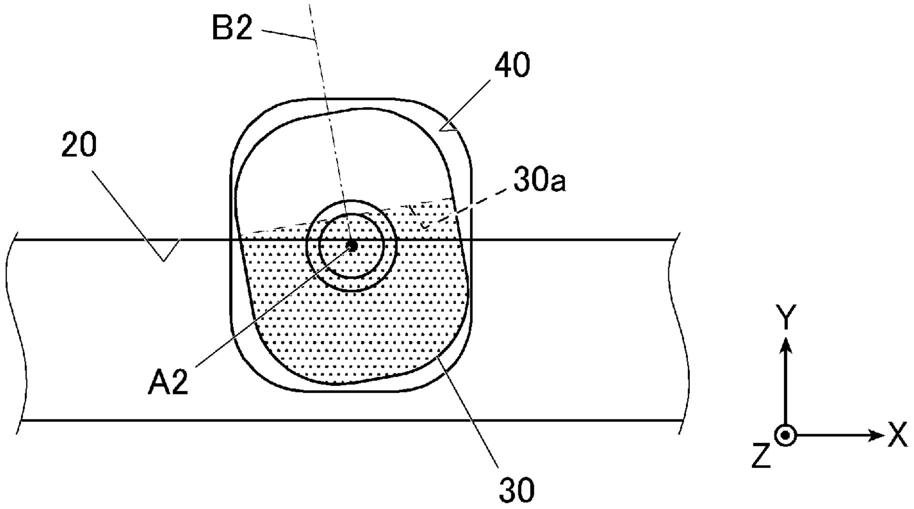
FIG. 11C is a diagram illustrating a limitation of rotation of the pin catch in the recess.

FIG. 11A to FIG. 11C are diagrams each illustrating the limitation of rotation of the pin catch 30 in the recess 40. In FIG. 11B and FIG. 11C, the hatching (dots) indicate where the pin insertion path 30 is formed.

As shown in FIG. 11A, because of the gap (play) between the sidewall surface of the recess 40 and the side surface of the pin catch 30, the pin catch 30 can rotate slightly around the central axis A2 in the recess 40. FIG. 11A shows the direction B1 of the major axis of the pin catch 30 (main body 31) rotated clockwise to its maximum and the direction B2 of the major axis of the pin catch 30 rotated counterclockwise at its maximum. The pin catch 30 can rotate within the rotatable range R from a state in which the direction of the major axis is B1 to a state in which the direction of the major axis is B2. In FIG. 11A to FIG. 11C, the rotatable range R is exaggerated and drawn larger than it actually is for the sake of explanation.

Here, the pin catch 30 is shaped so as to pass the first portions 11 and the second portions 12 of the connecting pin 10 through the pin insertion path 30*a* when in the second position, as long as the direction of the major axis of the pin catch 30 is within the rotatable range R. That is, in any state between the state in which the direction of the major axis of the pin catch 30 is B1 as shown in FIG. 11B and the state in which the direction of the major axis of the pin catch 30 is B2 as shown in FIG. 11C, the insertion hole 20 passes through the cutout (dotted area) as the pin insertion path 30*a*, and is not interrupted by the pin catch 30. As a result, when the pin catch 30 is moved to the second position, the connecting pin 10 can pass through the pin insertion path 30*a* without adjustment of the rotational direction of the pin catch 30.

At a part of one or both ends of the rotatable range R, the connecting pin 10 may be configured not to pass through the pin insertion path 30*a*. As the connecting pin 10 can pass through the pin insertion path 30*a* in most of the rotatable range R even in such a configuration, the direction of the pin catch 30 can be adjusted with ease to some extent. In this case, the end surface 32*a* of the pin catch 30 may have a groove that fits a tool for rotating the pin catch 30.

<Spring>

As shown in FIG. 4 to FIG. 7, the spring 60 is located between the bottom 40*a* of the recess 40 and the pin catch 30. The end of the spring 60 in the +Z direction abuts on the end surface of the main body 31 of the pin catch 30 in the −Z direction. The spring 60 exerts an elastic force in the +Z direction on the pin catch 30. When the pin catch 30 is not subjected to a force in the −Z direction from outside the recess 40, the spring 60 biases the pin catch 30 in the +Z direction until the pin catch 30 abuts on the lid 50. When the pin catch 30 is pushed in the −Z direction through the opening 53, the spring 60 contracts in the Z direction until the abutment 33 of the pin catch 30 abuts on the bottom 40*a* of the recess 40 depending on the force in the −Z direction received from the pin catch 30.

<Connecting Pin Catching State>

Figure 12A:
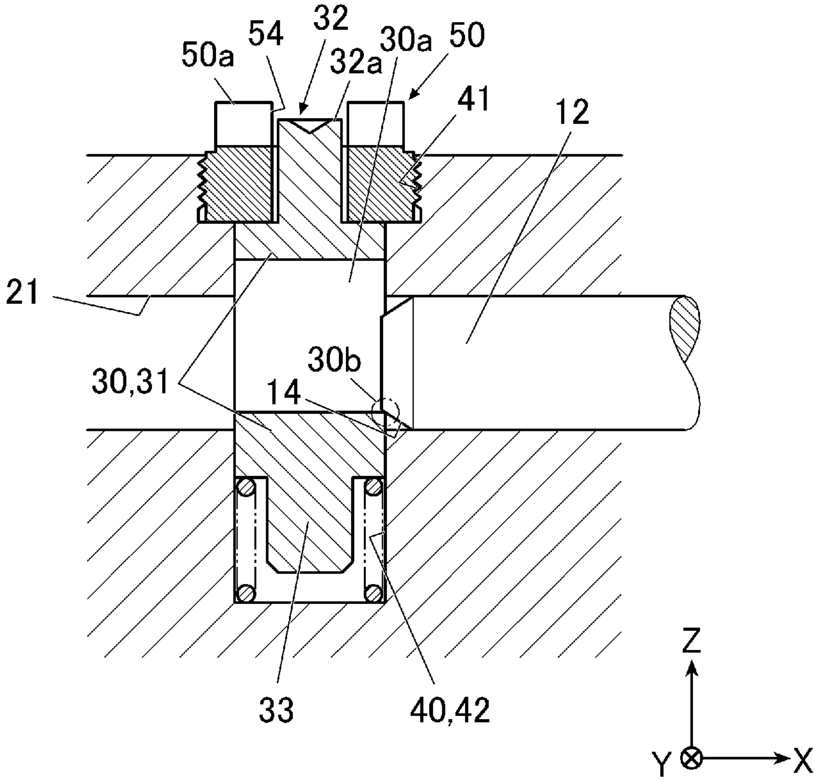
FIG. 12A is a diagram showing behavior of the connecting pin during insertion

By inserting the connecting pin 10 into the communicating insertion hole 20 while the pin catch 30 and the spring 60 are stored in the recess 40 covered with the lid 50, the connecting pin catching state shown in FIG. 3 to FIG. 5 can be achieved. In detail, when the connecting pin 10 is inserted into the communicating insertion hole 20 with the pin catch 30 being in the first position, the taper 14 on the tip of the connecting pin 10 abuts on the edge 30*b* of the pin insertion path 30*a* as shown in FIG. 12A. As the connecting pin 10 is continuously pushed in, the taper 14 pushes the edge 30*b* of the pin insertion path 30*a* down in the −Z direction, and the second portion 12 of the connecting pin 10 passes through the pin insertion path 30*a* as shown in FIG. 12B.

Instead of the above, the connecting pin 10 may be inserted through the pin insertion path 30*a* in a state where the pin catch 30 (pusher 32) is pushed from outside of the recess 40 through the opening 53 of the lid 50 in the −Z direction in response to user operation and moves to the second position or a position between the first position and the second position.

Figure 12B:
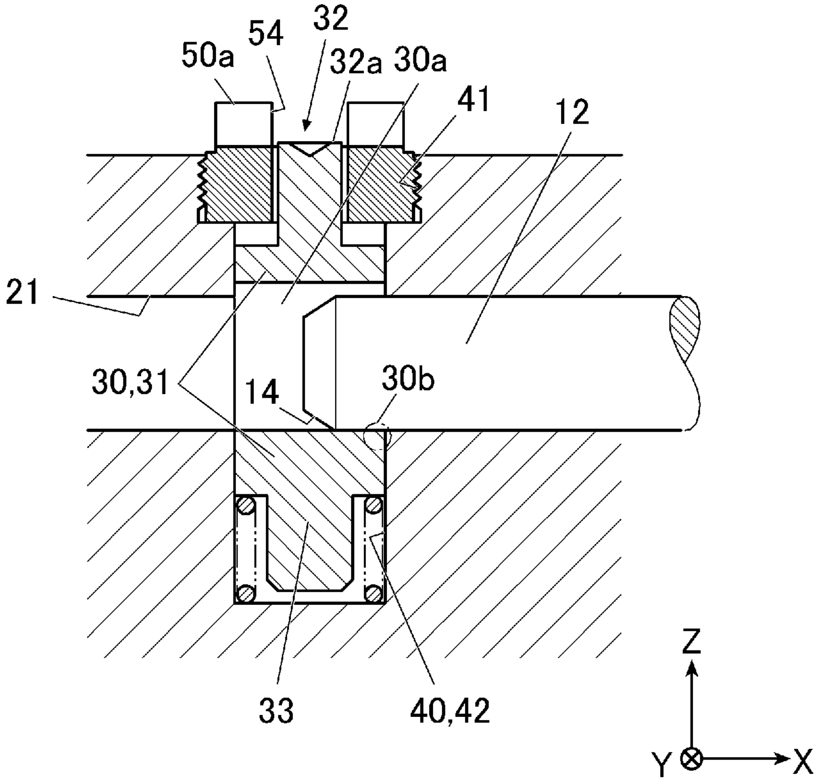
FIG. 12B is a diagram showing behavior of the connecting pin during insertion

When the connecting pin 10 is pushed in the −X direction until the first portion 11 of the connecting pin 10 comes to the position of the pin insertion path 30*a* as shown in FIG. 12B, the pin catch 30 moves to the first position due to the elastic force of the spring 60, the edge 30*b* of the pin insertion path 30*a* hooks the step 13 of the connecting pin 10, and the connecting pin 10 is caught as shown in FIG. 3 to FIG. 5. In this connecting pin catching state, among the first portion 11 and the second portions 12 of connecting pin 10, only the first portion 11 can pass through the pin insertion path 30*a*, and the second portions 12 are caught by the pin catch 30. The connecting pin catching state in which the connecting pin 10 is inserted into the communicating insertion hole 20 with the band attachment 2*a* of the device body 2 fitted into the connection recess 3*b* of the attachment end 3*a* of the band 3, the device body 2 and the band 3 can be connected while the connecting pin 10 does not come off the communicating insertion hole 20.

<Connecting Pin Releasing State>

When the pin catch 30 (pusher 32) in the connecting pin catching state is pushed in response to user operation in the −Z direction from outside the recess 40 through the opening 53 in the lid 50 to move until the abutment 33 abuts on the bottom 40*a* of the recess 40, the pin catch 30 is in the second position shown in FIG. 6 and FIG. 7, and is in the connecting pin releasing state. In this connecting pin releasing state, the edge 30*b* of the pin insertion path 30*a* no longer hooks the step 13 of the connecting pin 10, and the first portion 11 and the second portions 12 of the connecting pin 10 can pass through the pin insertion path 30*a*. In other words, when the pin catch 30 is in the second position, the first portion 11 and the second portions 12 can pass through the edge 30*b* of the pin insertion path 30*a* (without being engaged by the edge 30*b*). Therefore, the connecting pin 10 can be detached from the communicating insertion hole 20 by being pushed in the X direction, and thus the connection between the device body 2 and the band 3 can be released.

Variation Example 1

Next, Variation Example 1 of the above embodiment is described. Variation Example 1 differs from the above embodiment in the shapes of the recess 40 and the pin catch 30. In the following, the differences from the above embodiment are described, and the common points to the above embodiment are omitted.

Figure 13:
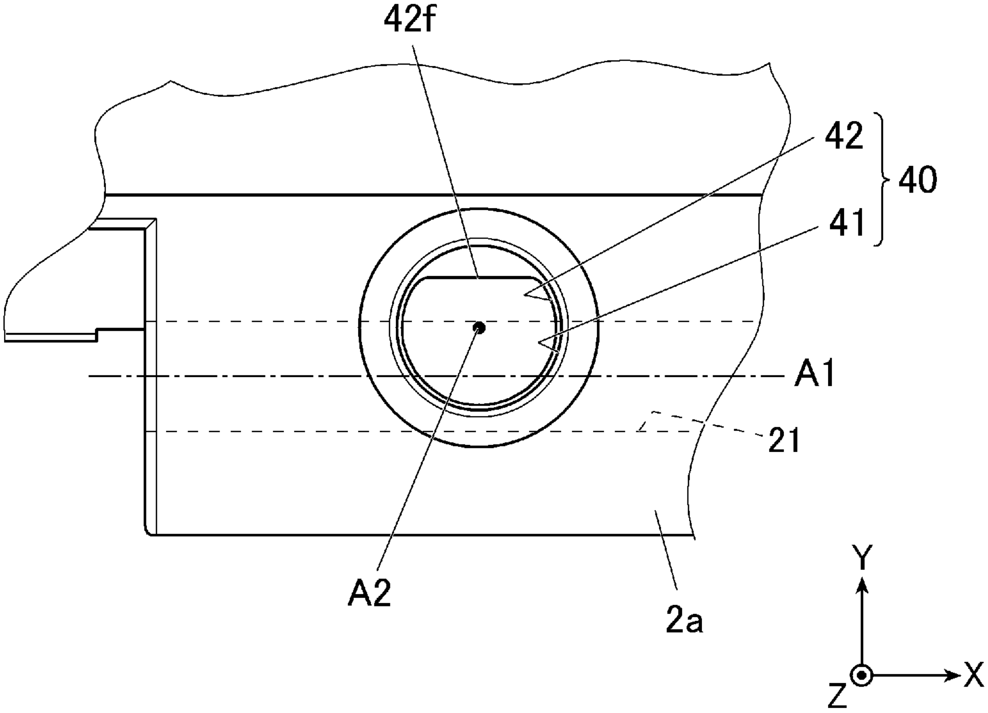
FIG. 13 is a diagram showing a recess according to Variation Example in a view from the +Z direction.

FIG. 13 is a diagram showing the recess 40 according to Variation Example 1 in a view from the +Z direction.

The major portion 42 (the portion abutting on the pin catch 30) of the recess 40 according to Variation Example 1 has a rotationally asymmetric shape in a view from the central axis A2 direction. Here, having the rotationally asymmetric shape means that the major portion 42 has the same shape as the original when rotated around the central axis A2 by an angle of 360°/n only when n is 1. In detail, the outline of the major portion 42 in a view from the central axis A2 direction consists of a part of a circumference of a circle and a string of the circle. That is, the sidewall surface of major portion 42 has a curved portion which is a part of a side surface of a cylinder and a plane 42*f* that is parallel to and does not intersect the central axis A2. The plane 42*f* and the curved portion of the sidewall surface of the major portion 42 may be smoothly connected so as not to form a sharp ridge.

Figure 14A:
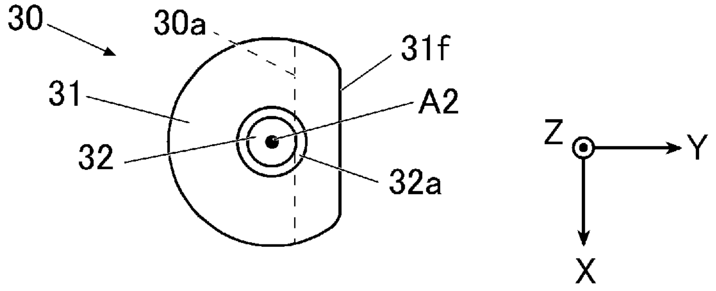
FIG. 14A is a diagram showing a configuration of a pin catch according to Variation Example.
Figure 14B:
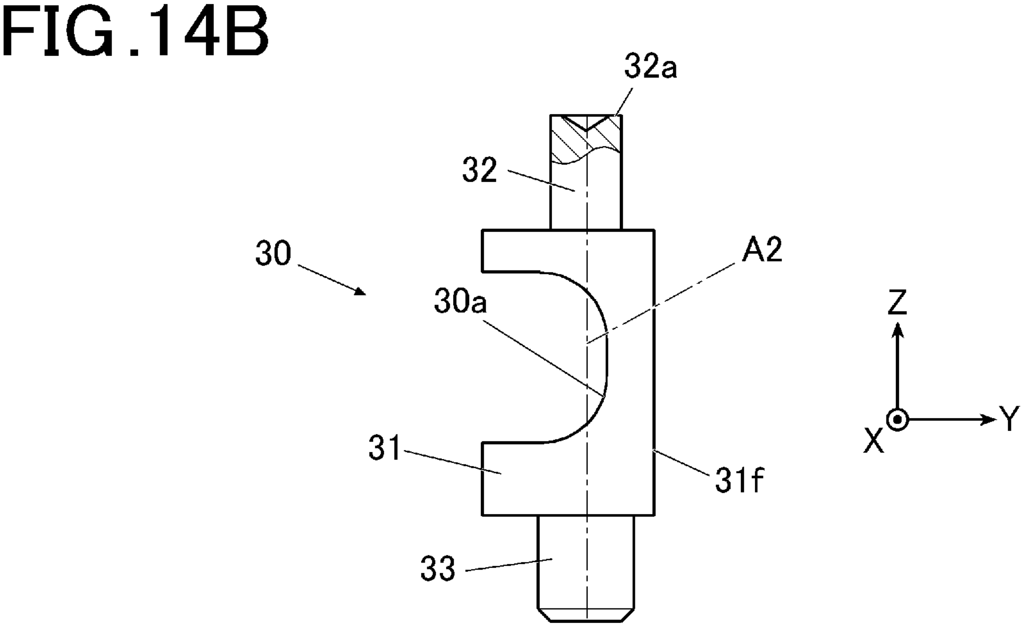
FIG. 14B is a diagram showing a configuration of the pin catch according to Variation Example.
Figure 14C:
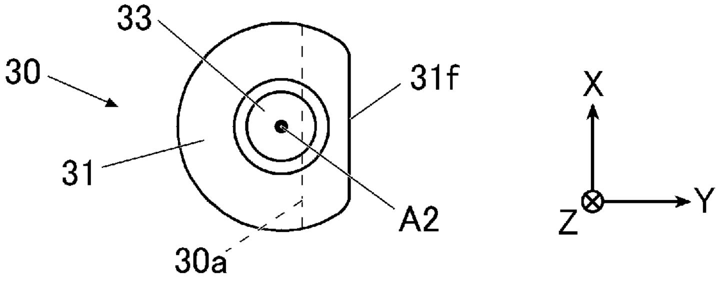
FIG. 14C is a diagram showing a configuration of the pin catch according to Variation Example.

FIG. 14A to FIG. 14C are diagrams each showing a configuration of the pin catch 30 according to Variation Example 1.

The main body 31 (the portion abutting on the recess 40) of the pin catch 30 according to Variation Example 1 has a rotationally asymmetric shape in a view from the central axis A2 direction. In detail, the outline of the main body 31 in a view from the central axis A2 direction consists of a part of a circumference of a circle and a string of the circle. That is, the main body 31 has a curved portion which is a part of a cylinder cut at a plane 31*f* that is parallel to and does not intersect the central axis A2. The plane 31*f* and the curved portion of the side surface of the main body 31 may be smoothly connected so as not to form a sharp ridge. In order for the pin catch 30 to move smoothly in the recess 40 in the Z direction, the shape of the main body 31 in a view from the central axis A2 direction is one size smaller than the sidewall surface of the major portion 42 such that a certain gap can be secured between the main body 31 and the sidewall surface of the major portion 42 of the recess 40.

Thus, by making the recess 40 and pin catch 30 each rotationally asymmetric, the pin catch 30 can enter the recess 40 only when it is in a certain orientation. (However, deviation in the rotatable range due to the gap mentioned above is allowed) In other words, the orientation of the pin catch 30 within the recess 40 can be limited to a certain orientation. The plane 42*f* of the recess 40 faces the plane 31*f* of the pin catch 30 in the above certain orientation. When the pin catch 30 in this certain orientation is located in the recess 40, the pin insertion path 30*a* is located in a position and a range so as to be connected to the body-side insertion hole 21 (communicating insertion hole 20). As a result, by adjusting the pin catch 30 to be in the certain orientation to enter the recess 40 and by storing the pin catch 30 in the recess 40, it is possible to easily align the pin insertion path 30*a* and the body-side insertion hole 21. For example, when the pin catch 30 in FIG. 3 is rotated 180° around the central axis A2 and stored in the recess 40, the pin insertion path 30*a* is on the side of the +Y direction and is not aligned with the body-side insertion holes 21. However, according to the configuration of Variation Example 1, such a situation can be avoided.

The shape of the recess 40 and the pin catch 30 may be any rotationally asymmetric shape in a view from the central axis A2 direction, and are not limited to those shown in FIG. 13 and FIG. 14A to FIG. 14C. For example, the outline of the recess 40 and the pin catch 30 in a view from the central axis A2 direction may consist of a part of a circumference of an ellipse and a string of the ellipse. Alternatively, one of the recess 40 and the pin catch 30 may have a protruding portion in a view from the central axis A2 direction, and the other may have a depressed portion that fits the protruding portion.

Variation Example 2

Next, Variation Example 2 of the above embodiment is described. Variation Example 2 differs from the above embodiment in that the recess 40 is formed at the attachment end 3*a* and the like. Variation Example 2 may be combined with Variation Example 1.

Figure 15:
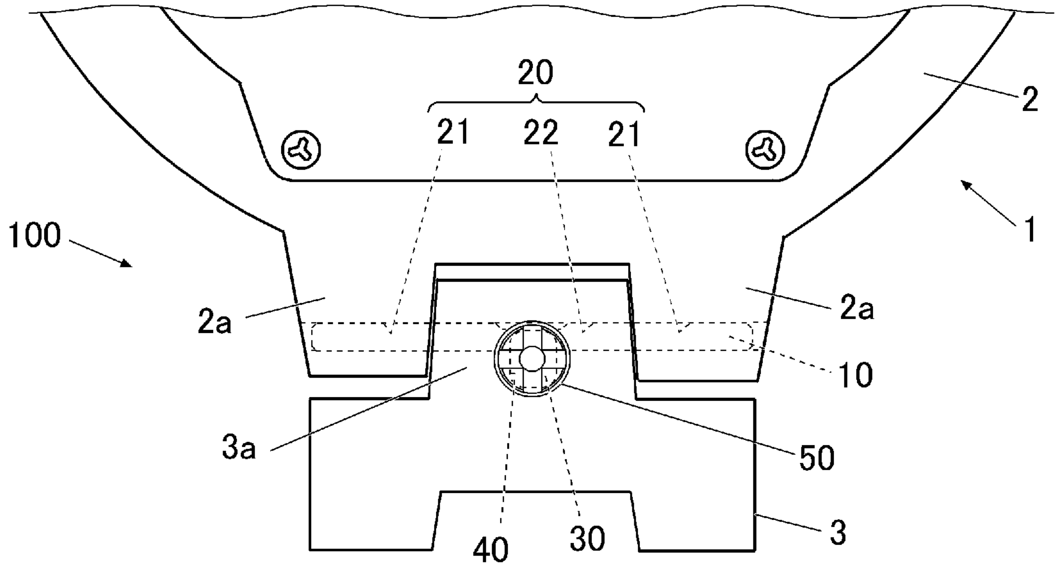
FIG. 15 is a diagram showing a configuration of a timepiece and a band connecting structure according to Variation Example 2.

FIG. 15 is a diagram showing the configuration of the timepiece 1 and the band connecting structure 100 according to Variation Example 2.

In Variation Example 2, the attachment end 3*a* of the band 3 forms the connection protrusion, and the band attachment 2*a* of the device body 2 has a connection recess shaped to fit the attachment end 3*a* of the band 3. The attachment end 3*a* has the band-side insertion hole 22, and a pair of tips of the band attachment 2*a* have respective body-side insertion holes 21. The body-side insertion holes 21 and the band-side insertion hole 22 communicate with each other to form a communicating insertion hole 20 through which the connecting pin 10 is inserted. In Variation Example 2, the attachment end 3*a* has the recess 40. This recess 40 stores the pin catch 30 and the spring 60, and the lid 50 is attached to the opening edge 41 of the recess 40. The structure of the band connecting structure 100 according to Variation Example 2 is the same as that of the above embodiment, except for the position of the recess 40.

Variation Example 3

Next, Variation Example 3 of the above embodiment is described. Variation Example 3 differs from the above embodiment in the structure of the lid 50. Variation Example 3 may be combined with at least one of Variation Example 1 and Variation Example 2.

Figure 16:
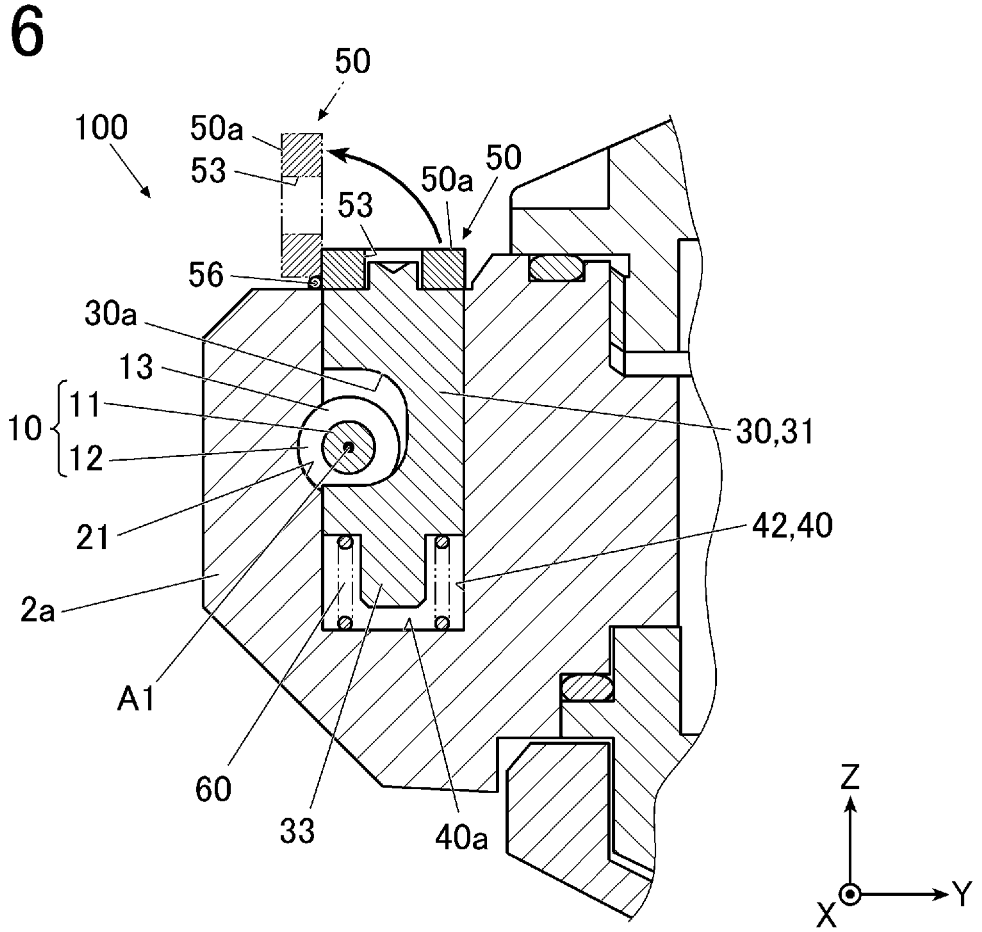
FIG. 16 is a diagram showing a cross section perpendicular to the X direction of a band connecting structure according to Variation Example 3.

FIG. 16 is a diagram showing a cross section perpendicular to the X direction of a band connecting structure according to Variation Example 3.

As shown in FIG. 16, the lid 50 according to Variation Example 3 has a hinge 56 fixed to the band attachment 2*a* of the device body 2 and pivots on the hinge 56. In detail, the lid 50 can pivot between a state of closing the opening of the recess 40 indicated by solid lines in FIG. 16 and a state of opening the recess 40 indicated by dashed lines in FIG. 16. The lid 50 has a clasp (for example, a snap), not shown in the drawing, at an end opposite to the hinge 56. The clasp fixes the end to the band attachment 2*a* and holds the lid 50 in a closing state (in the state indicated by the solid lines). The lid 50 in the state fixed by the clasp holds the pin catch 30 against the biasing force by the spring 60. Therefore, the state in which the lid 50 is closing the opening of the recess 40 indicated by the solid lines corresponds to the "first state", in which the lid 50 holds the pin catch 30 in cooperation with the spring 60. The state in which the lid 50 is opening the opening of the recess 40 indicated by the dashed lines corresponds to the "second state", in which the pin catch 30 can be taken out of the recess 40. Therefore, the lid 50 can be selectively operated to be in the "first state" and the "second state" by pivoting on the hinge 56.

The lid 50 is not limited to one that pivots on the hinge 56, but may be, for example, a sliding shutter that can slide in a direction parallel to the XY plane in FIG. 16.

<Effects>

As described above, the band connecting structure 100 as the connecting structure of the present embodiment includes: the connecting pin 10 that has the first portion 11 and the second portion(s) 12 thicker than the first portion with the step(s) 13 between the first portion 11 and the second portion(s) 12 and that is inserted into the body-side insertion hole 21 of the device body 2 as the connecting object and the band-side insertion hole 22 of the band 3 as the connected object to connect the device body 2 and the band 3 to each other; the pin catch 30 that moves in the recess 40 in the device body 2 in the moving directions (Z direction, −Z direction) that are not parallel to the extending direction in which the body-side insertion hole 21 of the device body 2 extends and that has the edge(s) 30*b* (pin engagement portion) of the pin insertion path 30*a* that engages the step(s) 13 of the connecting pin 10; the spring 60 as the biasing member that biases the pin catch 30 in one direction among the above moving directions; and the lid 50 as a holder that is provided on the device body 2 and transitions, in response to user operation, to one of the first state in which the lid holds the pin catch 30 in cooperation with the spring 60 or the second state in which the pin catch 30 can be detached from the recess 40.

According to such a configuration, the pin catch 30 and/or the spring 60 stored in the recess 40 can be taken out when the lid 50 is set to be in the second state. Therefore, the pin catch 30 and/or the spring 60 can be easily repaired or replaced, and the band connecting structure 100 can be easily maintained.

The lid 50 detachably attached to the device body 2 enters the first state by being attached to the device body 2 and enters the second state by being detached from one of the connecting object and the connected object. Since the lid 50 is configured to be completely detachable from the device body 2, the pin catch 30 and/or the spring 60 can be easily taken out. Also, the lid 50 can be replaced easily.

The lid 50 in the first state is screwed to the device body 2. This allows the lid 50 to be attached or detached with a simple operation of rotating the lid 50.

The lid 50 has, on the surface opposite to the surface facing the spring 60, the groove 54 that is configured to fit a tool used to rotate the lid 50 when attaching the lid 50 to the device body. This allows the lid 50 to be firmly fixed using the tool, and the firmly fixed lid 50 to be easily detached using the tool.

In a view from a longitudinal direction of the body-side insertion hole 21 (communicating insertion hole 20), the central axis A2 passing the center of the cross section perpendicular to the moving directions of the pin catch 30 does not intersect the insertion axis A1 passing the center of the cross section perpendicular to the longitudinal direction. The pin engagement portion that engage the connecting pin 10 at the step 13 is the edge 30*b* of the pin insertion path 30*a* (cutout) in the pin catch 30, and the cutout is formed at least at a portion where the insertion axis A1 passes. According to this configuration, the pin catch 30 can be downsized due to its smaller maximum width in the direction perpendicular to the central axis A2 compared to the configuration where the central axis A2 intersects the insertion axis A1 at a single point and the pin engagement portion is the edge of a hole through the pin catch 30. Also, since the diameter of the connecting pin 10 is not limited to less than the maximum width of the pin catch 30, the connecting pin 10 can be designed freely.

The pin catch 30 can move in the recess 40 in the moving directions between the first position and the second position, where the second position is different from the first position. When the pin catch 30 is in the first position in response to the cooperation of the spring 60 and the lid 50, the connecting pin 10 engages the edge 30*b* of the pin insertion path 30*a* at the step 13. When the pin catch 30 is in the second position in response to user operation against the biasing force by the spring 60, the second portion 12 can pass through the edge 30*b* of the pin insertion path 30*a*.

This allows the connecting pin 10 caught by the pin catch 30 to be released with a simple operation of moving the pin catch 30 against the biasing force by the spring 60. By removal of the released connecting pin 10 from the insertion hole 20, the connection between the device body 2 and the band 3 is released and the band 3 can be replaced. Therefore, the band 3 can be replaced with a simple operation that does not require special tools or skills.

In addition, because of the structure of catching the connecting pin 10 in which the edge 30*b* of the pin insertion path 30*a* of the pin catch 30 hooks the step 13 between the first portion 11 and the second portion 12 of the connecting pin 10, the contact area between the pin catch 30 and the connecting pin 10 can be large, which allows the connecting pin 10 to be caught more securely. Therefore, even when the band connecting structure 100 is subjected to a shock, the connecting pin 10 is not easily released. Therefore, it is possible to prevent unintentional detachment of the band 3.

The pin catch 30 has the abutment 33 which, when the pin catch 30 is in the second position, abuts on the bottom 40*a* (wall) of the recess 40 intersecting a line in the above moving directions through the recess at a point. This allows the pin catch 30 to move to the second position and to release the connecting pin 10 using a clear operation of pushing the pin catch 30 until the abutment 33 abuts on the bottom 40*a* of the recess 40.

When the elastic member is the spring 60, which is a compression coil spring, and the abutment 33 is located inside the spring 60, the spring 60 and the abutment 33 can be compactly stored in the recess 40. Therefore, the recess 40 and the band connecting structure 100 can be downsized.

The end surface 32*a* as the exposed surface of the surface of the pin catch 30 is exposed from the lid 50, and closer to the spring 60 than the top surface 50*a* of the lid 50 is. The top surface 50*a* is opposite to the surface of the lid 50 facing the spring 60.

Thus, since the end surface 32*a* of the pin catch 30 is closer to the spring 60 than the top surface 50*a* of the lid is, it is possible to suppress the occurrence of a problem in which the pin catch 30 is pushed in against the user's intention. As a result, the disconnection between the device body 2 and the band 3 due to mishandling can be less likely to occur.

When the pin catch 30 moves in the above moving direction, the end surface 32*a* as the exposed surface moves in the opening of the lid 50 in the above moving direction. As a result, for example, the end surface 32*a* can be pushed in by a simple method of inserting a rod or the like in the opening 53, such that the pin catch 30 can be moved to the second position. Also, since the position of the end surface 32*a* when it is pushed in is stabilized by being regulated by the inner wall surface of the opening 53, the end surface 32*a* can be easily pushed in.

The lid 50 has the base 51 and the protrusion 52. The base 51 has the opening 53. The protrusion 52 protrude from the base 51 outwardly in the above moving direction. When the connecting pin 10 engages the edge 30*b* of the pin insertion path 30*a* as the pin engagement portion at the step 13, the end surface 32*a* is located closer to the spring 60 than the top surface 50*a* of the protrusion 52 is. The top surface 50*a* is opposite to the surface facing the spring 60 of the protrusion 52. The protrusion 52 is located around the end surface 32*a*, in a view from the above moving directions. Thus, because of the protrusion 52 around the end surface 32*a* as the exposed surface, it is possible to more reliably suppress the occurrence of a problem in which the pin catch 30 is pushed in against the user's intention.

The timepiece 1 as the wearable device of the present embodiment includes the device body 2 as the connecting object, the band 3 as the connected object for attaching the device body 2 to the object, and the band connecting structure 100 described above. As a result, the band 3 can be replaced with a simple operation. Also, the band connecting structure 100 can be easily maintained. Also, the disconnection between the device body 2 and the band 3 due to mishandling can be less likely to occur.

<Others>

The descriptions in the above embodiments are merely examples of the connecting structure and the wearable device related to the present invention and are not intended to limit the present invention.

Examples of the wearable device include the timepiece 1, but are not limited to this. The wearable device may be any device that the user wears on the body, such as a health care device like an activity meter.

The connecting object is not limited to the device body 2 of the timepiece 1, and the connected object is not limited to the band 3 of the timepiece 1. For example, the connecting object and the connected object each may be one of a plurality of pieces constituting the band 3. In other words, the connecting structure may be used to connect the pieces that constitute the band 3.

The attachment method of the lid 50 to the device body 2 or the band 3 is exemplified by, but is not limited to, screwing. The attachment method can be any method that enables attachment and detachment without destroying the attachment site (opening edge 41 in the above embodiment) on the device body 2 or the band and the lid 50. For example, the lid 50 may be attached to the opening edge 41 of the recess 40 with a snap fit in which a protruding portion and a recessed portion respectively on the opening edge 41 and the lid 50 are fitted together.

The holder is not limited to the lid 50 attached to the opening edge 41 of the recess 40, but may be in any position and shape as long as it can limit the movement of the pin catch 30 in the recess 40. For example, the holder may be a member attached to the sidewall surface of the recess 40 or a projecting member on the sidewall surface of the recess 40.

The example shows the configuration in which the recess 40 extends in the Z direction, but does not limit the present invention. The direction in which the recess 40 extends may be inclined with respect to the Z direction.

Instead of the example showing a configuration in which the insertion axis A1 of the communicating insertion hole 20 does not intersect the central axis A2 of the pin catch 30 located in the recess 40, the insertion axis A1 may intersect the central axis A2 at a single point. In this case, the pin insertion path 30*a* is a hole through the pin catch 30 so that the connecting pin 10 inserted into the communicating insertion hole 20 can pass through the center of the pin catch 30 located in the recess 40.

The pin catch 30 has a pin insertion path 30*a*, and the edge 30*b* of the pin insertion path 30*a* corresponds to the pin engagement portion in the above example, but is not limited to this. For example, the pin catch may have a projecting pin engagement portion at the tip that engages the step 13 of the connecting pin 10.

The groove at the first portion 11 of the connecting pin 10 does not have to circle around the outer circumference, but may be provided partially on the outer circumference. For example, when the pin catch with the above-mentioned projecting pin engagement portion is used, the groove only needs to be at least large enough to allow engagement of the pin engagement portion.

The communicating insertion hole 20 is not necessarily a through hole through the band attachment 2*a* of the device body 2 and the attachment end 3*a* of the band 3. One end of the through hole (the farther end from the body-side insertion hole 21 of the ends of one of the band-side insertion holes 22 when the communicating insertion hole 20 is applied to the embodiment in FIG. 2) may be closed and used as the communicating insertion hole 20. In this case, the connecting pin 10 may have only one second portion 12 on a closed-end side of the first portion 11. According to this configuration, the movement of the connecting pin 10 toward the closed end is limited by the closed end, and the movement toward the side opposite to the closed end is limited by the engagement of the step 13 with the pin catch 30.

The biasing member is exemplified by the spring 60, which is a compression coil spring, but is not limited to this. The biasing member may be a spring having a shape other than a coil shape or a member made of an elastic material such as silicon. The biasing member may be a tensile spring provided between the pin catch 30 and the lid 50 and attached to both the pin catch 30 and the lid 50. In this case, the tensile spring may be detachable or non-detachable from both pin catch 30 and the lid 50. The biasing member may be one that magnetically biases the pin catch 30 toward the lid 50.

In order to move the pin catch 30 from the first position to the second position, in the method exemplified above, the pusher 30 of the pin catch 30 is pushed in the −Z direction. However, alternatively, the pin catch 30 may be pulled in the −Z direction from the side opposite to the lid 50 to move. To do this, for example, the bottom 40*a* of the recess 40 is partially penetrated in a direction opposite to the opening edge 41, and the pin catch 30 protrudes out of the through hole such that the user can pull it.

The wall of the recess 40 on which the abutment 33 of the pin catch 30 abuts is exemplified by the bottom 40*a* having a plane parallel to the X-Y plane, but is not limited to this. The wall may be in any shape on which the abutment 33 of the pin catch 30 can abut. A part of the bottom of the recess 40 may have a through hole that penetrates to the side opposite to the opening edge 41 of the recess 40.

The lid 50 is detachably attached in the above examples, but is not limited to this. The lid 50 may be fixed to the opening edge 41 of the recess 40 in a non-detachable manner. The lid 50 may be a part of the band attachment 2*a* (attachment end 3*a* in Variation Example 2: the same applies below). In other words, the lid 50 may be integral with the band attachment 2*a*.

It is of course possible to change the detailed configuration and detailed operation of the components of the timepiece 1 and the band connecting structure 100 in the above embodiment as appropriate as long as they do not depart from the gist of the present invention.

Although several embodiments of the present invention have been described above, the scope of the present invention is not limited to the embodiments described above, but includes the scope of the present invention described in the claims and the scope of their equivalents.

What is claimed is:

1. A connecting structure comprising:

a connecting pin that has a first portion, a second portion thicker than the first portion, and a step between the first portion and the second portion and connects a connecting object and a connected object to each other by being inserted into a first insertion hole of the connecting object and a second insertion hole of the connected object;

a pin catch that moves in a recess in one of the connecting object and the connected object in moving directions that are not parallel to an extending direction of an insertion hole of the one of the connecting object and the connected object and has a pin engagement portion that engages the step of the connecting pin, the insertion hole being one of the first insertion hole and the second insertion hole;

a biasing member that biases the pin catch in a direction among the moving directions; and a holder that is provided on the one of the connecting object and the connected object and transitions, in response to user operation, to one of a first state in which the holder holds the pin catch in cooperation with the biasing member and a second state in which the pin catch is detachable from the recess, wherein:

the pin catch moves in the recess between a first position and a second position that is different from the first position in the moving directions;

upon the pin catch being in the first position in response to cooperation of the biasing member and the holder, the connecting pin engages the pin engagement portion at the step;

upon the pin catch being in the second position in response to user operation against biasing force by the biasing member, the second portion passes through the pin engagement portion;

the pin catch has an abutment;

upon the pin catch being in the second position, the abutment abuts on a wall of the recess, the wall intersecting a line through the recess at a point that is in the moving directions;

the biasing member is a compression coil spring; and the abutment is located inside the compression coil spring.

2. The connecting structure according to claim 1, wherein the holder is detachably attached to the one of the connecting object and the connected object, enters the first state upon the holder being attached to the one of the connecting object and the connected object, and enters the second state upon the holder being detached from the one of the connecting object and the connected object.

3. The connecting structure according to claim 2, wherein, in the first state, the holder is screwed to the one of the connecting object and the connected object.

4. The connecting structure according to claim 3, wherein the holder has a groove on a surface opposite to a surface facing the biasing member, the groove fitting a tool that is used to rotate the holder upon the holder being attached to the one of the connecting object and the connected object.

5. The connecting structure according to claim 4, wherein:

a central axis of the pin catch does not intersect an insertion axis in a view from a longitudinal direction of the insertion hole, the central axis passing a center of a cross section perpendicular to the moving directions, the insertion axis passing a center of a cross section perpendicular to the longitudinal direction; and the pin engagement portion is an edge of a cutout in the pin catch, the cutout being at least at a portion where the insertion axis passes.

6. The connecting structure according to claim 4, wherein:

the pin catch moves in the recess between a first position and a second position that is different from the first position in the moving directions;

upon the pin catch being in the first position in response to cooperation of the biasing member and the holder, the connecting pin engages the pin engagement portion at the step; and upon the pin catch being in the second position in response to user operation against biasing force by the biasing member, the second portion passes through the pin engagement portion.

7. The connecting structure according to claim 3, wherein:

a central axis of the pin catch does not intersect an insertion axis in a view from a longitudinal direction of the insertion hole, the central axis passing a center of a cross section perpendicular to the moving directions, the insertion axis passing a center of a cross section perpendicular to the longitudinal direction; and the pin engagement portion is an edge of a cutout in the pin catch, the cutout being at least at a portion where the insertion axis passes.

8. The connecting structure according to claim 3, wherein:

the pin catch moves in the recess between a first position and a second position that is different from the first position in the moving directions;

upon the pin catch being in the first position in response to cooperation of the biasing member and the holder, the connecting pin engages the pin engagement portion at the step; and upon the pin catch being in the second position in response to user operation against biasing force by the biasing member, the second portion passes through the pin engagement portion.

9. The connecting structure according to claim 2, wherein:

a central axis of the pin catch does not intersect an insertion axis in a view from a longitudinal direction of the insertion hole, the central axis passing a center of a cross section perpendicular to the moving directions, the insertion axis passing a center of a cross section perpendicular to the longitudinal direction; and the pin engagement portion is an edge of a cutout in the pin catch, the cutout being at least at a portion where the insertion axis passes.

10. The connecting structure according to claim 2, wherein:

the pin catch moves in the recess between a first position and a second position that is different from the first position in the moving directions;

upon the pin catch being in the first position in response to cooperation of the biasing member and the holder, the connecting pin engages the pin engagement portion at the step; and upon the pin catch being in the second position in response to user operation against biasing force by the biasing member, the second portion passes through the pin engagement portion.

11. The connecting structure according to claim 1, wherein:

a central axis of the pin catch does not intersect an insertion axis in a view from a longitudinal direction of the insertion hole, the central axis passing a center of a cross section perpendicular to the moving directions, the insertion axis passing a center of a cross section perpendicular to the longitudinal direction; and the pin engagement portion is an edge of a cutout in the pin catch, the cutout being at least at a portion where the insertion axis passes.

12. The connecting structure according to claim 11, wherein:

the pin catch moves in the recess between a first position and a second position that is different from the first position in the moving directions;

upon the pin catch being in the first position in response to cooperation of the biasing member and the holder, the connecting pin engages the pin engagement portion at the step; and upon the pin catch being in the second position in response to user operation against biasing force by the biasing member, the second portion passes through the pin engagement portion.

13. The connecting structure according to claim 1, wherein the pin catch has an exposed surface that is exposed from the holder and located closer to the biasing member than a top surface of the holder is, the top surface of the holder being opposite to a surface of the holder that faces the biasing member.

14. The connecting structure according to claim 13, wherein, upon the pin catch moving in one of the moving directions, the exposed surface moves in the one of the moving directions in an opening of the holder.

15. The connecting structure according to claim 14, wherein:

the holder has a base and a protrusion, the base having the opening, and the protrusion protruding from the base outwardly in one of the moving directions; and upon the connecting pin engaging the pin engagement portion at the step:

the exposed surface is located closer to the biasing member than a top surface of the protrusion is, the top surface of the protrusion being opposite to a surface of the protrusion that faces the biasing member; and the protrusion is located around the exposed surface in a view from the moving directions.

16. A wearable device comprising:

a device body as the connecting object;

a band as the connected object that attaches the device body to an object; and the connecting structure according to claim 1.

* * * * *